3,513,150
METHOD OF MANUFACTURING
POLYETHYLENE
Ryo Matsuura, Shigeo Kamimura, Koichiro Iwasaki, Kazuo Yamaguchi and Jihei Inomata, Tokyo, Japan, assignors to Mitsubishi Chemical Industries Limited, Tokyo, Japan, a corporation of Japan
No Drawing. Filed Nov. 23, 1965, Ser. No. 509,425
Int. Cl. C08f 1/66, 1/72
U.S. Cl. 260—94.9          11 Claims

ABSTRACT OF THE DISCLOSURE

Polyethylene of relatively low molecular weight is produced in a hydrocarbon solvent in the presence of (1) γ-alumina having a particle size of 10 to 100 microns and reacted with gaseous titanium tetrachloride at 200 to 700° C. in a fluidized state and which may be optionally chlorinated, (2) a cocatalyst selected from the class consisting of a metal of Groups I, II and III of the Periodic Table, a hydride and a complex hydride of said metal and (3) hydrogen.

---

This invention relates to a method of manufacturing polyethylene, more particularly to the improvements in the catalytic polymerization of ethylene at relatively low temperatures and under relatively low pressures.

It has been known that α-olefins such as ethylene may be polymerized using certain catalysts, which are produced by heating a mixture of alumina and a halide of a transition metal of the Group IV, V or VI of the Periodic Table. In accordance with such method polyethylene may be obtained at relatively low temperatures, i.e. up to about 350° C. and under relatively low pressures, i.e. up to about 350 kg./cm.² G. However, the polymers obtained by such method cannot meet the requirements for the production of various moldings invaluable from practical view point.

The first object of the invention resides in the improvements in or relating to the above-mentioned method for polymerizing ethylene. Namely, the invention provides such polyethylenes that is highly suitable for the production of moldings invaluable from practical view point which include injection moldings such as crates and containers, extrusion moldings such as films, sheets and filaments and blow moldings such as bottles. In other words, the first object of the invention resides in the provision of a method for the production of some kinds of polyethylene having an appropriate certain molecular weight, molecular weight distribution, and crystallinity to meet requirements in the respective uses.

The second object of the invention resides in the provision of polymerization catalysts particularly fit for the production of polyethylene to accomplish the abovementioned objects.

The first object is accomplished by the method of polymerizing ethylene in an inert hydrocarbon solvent at a temperature of up to 350° C. under a pressure of up to 200 kg./cm.² G. in the presence of a catalyst selected from the class consisting of a reaction product of γ-alumina with titanium tetrachloride and a chlorination product of said reaction product, and a cocatalyst selected from the class consisting of a metal of the Groups I, II and III of the Periodic Table, a hydride and a complex hydride of said metal which method is is characterized in presenting hydrogen in said polymerization to improve the properties of polyethylene produced.

The second object of the invention is accomplished by reacting particles of γ-alumina with gaseous titanium tetrachloride diluted by an inert gas at an elevated temperature in a specific range in a fluidized state, or by further causing the reaction product thus obtained to come in contact with a chlorinating agent.

Other objects of the invention and the mode in which the objects are accomplished will be apparent from the following description.

γ-ALUMINA

In accordance with the invention γ-alumina is used to produce polymerization catalyst.

γ-alumina may be obtained by calcining a known crystalline alumina hydrate such as for example Hydrargillite (Gibbsite), Bayerite, or Boehmite under specific conditions. Generally, the calcination of said crystalline alumina hydrates results in various crystallographic transitions, i.e., intermediates such as ρ-, χ-, γ· η-, δ-, κ-, and θ-alumina, dependently of the calcining temperature and the kind of starting alumina hydrates which intermediates eventually turn out α-alumina. The abovementioned intermediates will be referred to hereinafter as "γ-alumina." γ-alumina has a crystalline structure in which a specific position is occupied by hydrogen atom regularly or irregularly, showing a clear X-ray diffraction pattern at a 1.39–1.40 A. position.

γ-alumina which is applicable to the production of catalyst of the invention is advantageously manufactured by calcining the aforementioned known crystalline alumina hydrates of particle size, especially in the range from 10 to 100 microns at a temperature from 300 to 700° C., preferably from 400 to 600° C. in a water-free inert gas such as nitrogen or air.

PREPARATION OF CATALYST

Three methods may be applied to the production of polymerization catalyst for use in the invention as follows:

(1) The first method comprises passing gaseous $TiCl_4$ diluted by a dry inert gas such as $N_2$ or air through a vertical type reactor filled with the abovementioned γ-alumina of 10–100 micron size upwardly from the bottom at a temperature from about 200 to 700° C. preferably from 300 to 500° C. at a linear velocity so as to maintain an appropriate fluidized state in order to effect the reaction of γ-alumina and $TiCl_4$. The dilution of $TiCl_4$ by use of an inert gas is carried out by mixing beforehand the vapor of $TiCl_4$ maintained at a boiling temperature with an inert gas such as nitrogen, or by saturating the inert gas with $TiCl_4$ at a temperature from 10 to 100° C., preferably from 30 to 80° C., or by introducing separately the vapor of $TiCl_4$ and the inert gas into the lower portion of the aforesaid reactor.

The flow rate of gases ($TiCl_4$ and $N_2$) passing through the reactor is a factor of supreme importance to carry out the reaction of γ-alumina and $TiCl_4$. The flow rate of the gases at the inlet of said reactor for maintaining γ-alumina in a fluidized state corresponds to a linear velocity in the range from 10 to 2000 cm./min., preferably from 100 to 700 cm./min. $TiCl_4$ in an amount in the range from about 0.01 ml. to 10 ml. per 1 gram of γ-alumina is required for the reaction.

The chemical structure of the reaction product obtained by the abovementioned method has not become known to us as yet. However, we are certain that the reaction product is neither a mixture of γ-alumina and $TiCl_4$ nor γ-alumina having $TiCl_4$ adsorbed. For example, should the reaction product merely a mixture of $TiCl_4$ and γ-alumina, almost all the amount of $TiCl_4$ ought to be extracted by adding a solvent such as cyclohexane to the reaction product. In practice, however, an addition of cyclohexane to the reaction product followed by heating resulted in substantially no extraction of titanium compound. Further, should the reaction product be γ-alumina having $TiCl_4$ adsorbed, a nitrogen treatment of the product ought to result in separation of $TiCl_4$, showing reduced Ti- and Cl contents. In practice, however, when subjected to a nitrogen gas treatment the reaction product indicated no appreciable change in the Ti- and Cl contents.

(2) The second method for producing catalyst of the invention comprises causing the reaction product obtained by the abovementioned first method to come in contact in a fluidized state with a gaseous chlorinating agent diluted by a dry inert gas such as nitrogen or air at a temperature of 100 to 600° C., preferably of 200 to 500° C. by introducing said chlorinating agent to the reactor from the bottom thereof at a linear velocity in the range from 10 to 2000 cm. per minute, preferably from 100 to 700 cm. per minute. The chlorinating agents include chlorine, hydrogen chloride, thionyl chloride, silicon tetrachloride, and nitrosyl chloride, whilst polyhalogeno hydrocarbons such as carbon tetrachloride, chloroform, methylene dichloride, and tetrachloro ethane are most preferred.

Although the chemical structure of the resulted chlorinating product has not been made clear as yet, there was noticed an appreciable increase in the chlorine content of the product.

(3) The third method for producing the catalysts of the invention comprises the first step of passing gaseous $TiCl_4$ diluted by a dry inert gas, i.e. $N_2$ gas or air through a vertical type reactor filled with γ-alumina having particle size in the range from 10 to 100 microns upwardly from the bottom of the reactor at a temperature below 400° C., preferably from 50 to 200° C. and at a velocity fit for maintaining a fluidized state for effecting reaction of γ-alumina and $TiCl_4$ and the second step of passing only an inert gas such as $N_2$ or air through the reactor at a temperature from 300 to 700° C., preferably from 300 to 500° C. However, it is to be noted that the temperature in the second step must be maintained higher than that in the first step. The flow rate of the gas or gases at the inlet of the reactor either in the first step or the second step corresponds to a linear velocity within the range 10–2000 cm./min., preferably 100–700 cm./min. The amount of $TiCl_4$ required for the first step ranges from 0.01 ml. to 10 ml. per 1 g. γ-alumina.

The inherent catalytic activities of the catalysts produced by the abovementioned three methods differ one another, dependently of the conditions under which the catalyst was produced. For example, the catalysts having a Cl/Ti molar ratio from 2.0 to 2.4 produced by the aforementioned method (1) are suitable for the manufacture of polyethylene to be used for conventional injection or extrusion moldings. Further, the catalysts having a Cl/Ti ratio from 2.4 to 3.5 produced by the aforementioned method (2) are suitable for the manufacture of polyethylene to be used for blow moldings. Still further, the catalysts having a Cl/Ti ratio from 1.8 to 2.0 produced by the aforementioned method (3) are suitable for the manufacture of polyethylene to be used for such injection moldings as crate or container which require excellent mechanical properties.

POLYMERIZATION

The polymerization of polyethylene in accordance with the invention is carried out in an inert hydrocarbon solvent at relatively low temperatures and under relatively low pressures in the presence of the aforesaid catalyst and a certain co-catalyst.

The suitable solvents include aromatic hydrocarbons such as benzene, toluene and xylene; aliphatic hydrocarbons such as heptane, hexane and actane; and cycloaliphatic hydrocarbons such as cyclohexane, cycloheptane and decalin.

The quantity of the catalyst employed in the polymerization determines to some extent the quantity of polymer produced. Generally, the quantity of catalyst is selected among the range 0.1–100 g., preferably 0.5–10.0 g. per 1 litre of solvent employed in the polymerization.

The co-catalysts employed in the polymerization by the method include metals of the Groups I, II, and III of the Periodic Table, a hydride, and a complex hydride of said metals. Sodium, potassium, lithium, magnesium, calcium, aluminium, sodium hydride, potassium hydride, lithium hydride, magnesium hydride, calcium hydride, lithium aluminium hydride, and sodium aluminium hydride are representative co-catalysts. These co-catalysts serve to facilitate the polymerization reaction and regulate the molecular weight of produced polyethylene. It is preferred to employ the co-catalyst having particle size of about 10 to 200 micron, dispersed in a polymerization solvent. The quantity of co-catalyst required for the polymerization varies in the range from 0.01 to 10 parts, preferably from 0.05 to 1.0 part per 1 part of the catalyst employed by weight.

The polymerization reaction takes place at a temperature up to 350° C., preferably between 100° C. and 300° C., and under a pressure up to 200 kg./cm.$^2$, preferably between 10 kg./cm.$^2$ and 100 kg./cm.$^2$.

The method of the invention is particularly characterized in presenting hydrogen in the polymerization reaction to suitably regulate the properties of polyethylene produced. In accordance with the invention, hydrogen free from oxygen and water is introduced to the polymerization reaction zone under a specific partial pressure so as to suitably regulate the molecular weight of produced polyethylene. The hydrogen is fed to the reactor either solely or together with ethylene in a continuous manner, or otherwise the total quantity of hydrogen is fed to the reactor at the initial period of reaction in batchwise manner. Generally, the higher the partial pressure of hydrogen in the polymerization reaction zone, that is, the greater the amount of hydrogen introduced, the lower will be the molecular weight of polyethylene produced. The partial pressure of hydrogen in the polymerization zone, that is, the amount of hydrogen introduced may suitably be selected in view of the use of polyethylene produced, kind of catalyst employed, and conditions under which polymerization reaction takes place. For example, in the case of the production of a polyethylene which is fit for the manufacture of injection moldings such as crate and container employing a catalyst produced by the aforesaid catalyst manufacturing method (3), it is required to maintain the partial pressure of hydrogen relatively high in the polymerization reaction zone. Further, in the case of the production of polyethylene, which is fit for the manufacture of extrusion moldings such as films and sheets employing a catalyst manufactured by the aforesaid catalyst manufacturing method (1), it is required to maintain a moderate partial pressure of hydrogen in the polymerization reaction zone. Still further, in the case of the production of polyethylene, which is fit for the manufacture of blow moldings such as bottles employing a catalyst manufactured by the aforesaid catalyst manufacturing method (2), it may be well to maintain a relatively low partial pressure of hydrogen in the said reaction zone. Ordinarily, the partial pressure of hydrogen in the polymerization reaction zone is selected among the range from about $\frac{1}{100}$ to $\frac{1}{2}$ of the partial pressure of ethylene, the practical partial pressure of hydrogen being below 10 kg./cm.$^2$.

Upon completion of the polymerization reaction, unreacted ethylene is flashed off from the reaction mixture, then catalyst and co-catalyst are separated by filtration and the resultant polymer solution is cooled to precipitate polyethylene.

In accordance with the method of the invention a polyethylene of a straight chain structure having substantially no side chains and unsaturated bonds is obtained. Further, in accordance with the method of the invention, a polyethylene of higher density having a certain molecular weight in the range 30,000–200,000, especially 40,000–120,000 and a suitable molecular weight distribution is obtained. The said molecular weight, molecular weight distribution and crystallinity may be regulated as desired by selecting and combining the polymerization catalysts, polymerization reaction conditions, and amount of hydrogen introduced to the polymerization reaction zone.

The introduction of hydrogen to the polymerization reaction zone in accordance with the method of the invention renders it possible to suitably regulate the molecular weight of polymer produced and to improve the density of polymer produced as will be illustrated by reference to Examples 5 to 6 in the later part of the specification so as to enhance the mechanical strength of polymer produced while reducing the coloring degree of polymer produced.

Thus, the present invention provides the methods of manufacturing various types of polyethylene having respectively suitable grades for manufacturing injection moldings, extrusion moldings and blow moldings.

The present invention will now be illustrated by reference to the following examples describing representative methods for the manufacture of the catalysts and the polymerization of ethylene therewith.

EXAMPLE 1

Preparation of catalyst 225 g. sodium hydroxide were dissolved in 525 ml. water to which were added 95 g. aluminium chips and heated to dissolve aluminium. To the solution were added a quantity of water until the specific gravity of the filtrate reached 1.250 to obtain an aqueous solution of sodium aluminate ($Na_2O/Al_2O_3=1.6$). To 1.25 litre of this solution was introduced, while stirring, $CO_2$ gas at the rate of 1 l./min. to obtain a precipitate of crystalline alumina trihydrates (Bayerite), which was washed by water at 50° C. and dried for 2 hours at 120° C.

130 g. of thus obtained Bayerite having mean particle size of 50 micron were charged into a reactor of vertical type having 30 mm. diameter and 1 m. length, and calcined by passing dry nitrogen through the reactor at 500° C. for 2 hours to produce γ-alumina. Then, the reactor was kept at 120° C. and dry nitrogen saturated with $TiCl_4$ at 63° C. was allowed to pass through the reactor upwardly from the bottom for 4 hours. The linear velocity of the gas at a gas inlet disposed at the lower end of the reactor was maintained at 140 cm./min. so as to form a fluidized state of γ-alumina particles. The feed of $TiCl_4$ for the reaction amounted to 216 ml. in total. Upon completion of the reaction, dry nitrogen was passed through the reactor for 10 minutes at a linear velocity of 140 cm./min. in order to purge the reactor of unreacted $TiCl_4$. The temperature was then raised to 400° C. at which temperature only dry nitrogen was further admitted to the reactor via the bottom at a linear velocity of 70 cm./min.

introduced thereto while keeping the temperature of 235° C. and the pressure at 45 kg./cm.² G for effecting reaction for 2 hours. Upon completion of the reaction, the unreacted gases were flashed off from the reaction mixture which was filtered to remove insoluble matter, and the remaining polymer solution was cooled to 60° C. to take out precipitate of polymer which was washed by about 10 l. of cyclohexane and dried to obtain 450 g. of white polyethylene. The polymer thus obtained was found to have 100 p.p.m. ash content, 0.967 density in accordance with ASTM D–1248, 7.0 Melt Index in accordance with ASTM D–1238, and $4.8 \times 10^4$ average molecular weight calculated from Tung's equation. This polymer proved excellent in rigidity, showing $12.0 \times 10^3$ kg./cm.² of elasticity in accordance with ASTM D–638, 260 kg./cm.² of the first yield strength and 146 kg./cm.² of tensile impact in accordance with ASTM D–1822 L-shape.

The employment of n-heptane, toluene, or benzene in the same amount of cyclohexane gave similar results.

EXAMPLE 2

Preparation of catalyst 130 g. commercial crystalline alumina trihydrates (Hydrargillite) having average particle size of 60 micron were fed to a reactor of vertical type having 30 mm. diameter and 1 m. length and calcined by passing through dry nitrogen at 500° C. for 2 hours to produce γ-alumina. Then, dry nitrogen saturated with $TiCl_4$ at 63° C. was passed through the reactor upwardly from the bottom for 2 hours at 375° C. The linear velocity of the gas at the inlet was kept at 140 cm./min. to form a fluidized state of γ-alumina particles. The feed of $TiCl_4$ for the reaction amounted to 54 ml. in total. Upon completion of the reaction, the reactor was purged of unreacted $TiCl_4$ by passing dry nitrogen through the reactor at 375° C. and 140 cm./min. linear velocity for 10 minutes.

Polymerization

A 1 litre autoclave was fed with 1 g. catalyst which was obtained by the aforesaid method, 0.4 g. sodium hydride and 400 ml. cyclohexane which was dehydrated before hand. The autoclave was purged of air by passing dry nitrogen through it. The autoclave was then heated under stirring, ethylene and hydrogen were introduced while keeping the temperature at 225° C. and the total pressure at 40 kg./cm.² G to effect polymerization reaction. Upon completion of the reaction, the autoclave was purged of unreacted gases, catalyst was filtered, the filtrate was cooled, and the precipitate of produced polymer was taken out and dried. The following Table 1 shows the polymerization conditions and results thereof.

TABLE 1

| | $H_2$ feed, vol. percent | Average partial pressure of $H_2$, kg./cm.² [1] | Polymerization time, min. | Average rate of polymerization [2] | Polymer | | |
|---|---|---|---|---|---|---|---|
| | | | | | Yield, g. | Molecular weight | Density |
| 1 | 1.13 | 0.49 | 55 | 32.4 | 29.7 | $8.5 \times 10^4$ | .958 |
| 2 | 2.26 | 1.02 | 82 | 23.5 | 32.1 | $6.9 \times 10^4$ | .959 |
| 3 | 2.67 | 1.56 | 104 | 19.3 | 33.4 | $6.3 \times 10^4$ | .961 |
| 4 | 4.88 | 1.72 | 82 | 22.4 | 30.6 | $5.5 \times 10^4$ | .962 |
| 5 | 8.00 | 3.63 | 75 | 23.4 | 29.2 | $5.0 \times 10^4$ | .963 |
| 6 | 0 | 0 | 42 | 39.9 | 27.9 | $11.8 \times 10^4$ | .954 |

[1] Determined by means of gas chromatography.
[2] Produced polymer (g.)/catalyst (g.)×polymerization time in hour.

Polymerization 9.5 l. of cyclohexane were fed to a 25 l. autoclave and then nitrogen was introduced to purge the autoclave of air. A dispersion prepared by suspending in 0.5 l. cyclohexane 20 g. catalyst obtained by the aforementioned method and 6 g. sodium hydride was fed to the autoclave, heated under stirring, a gaseous mixture of ethylene and hydrogen containing 10% by volume of hydrogen was

EXAMPLE 3

A 1 litre autoclave was fed with 1 g. catalyst, which was produced by the method of Example 2, 0.4 g. sodium hydride and 400 ml. cyclohexane, heated under stirring, and ethylene and hydrogen were fed to the autoclave to effect reaction. Upon completion of the reaction, the autoclave was purged of unreacted gases, catalyst was filtered, and filtrate was cooled to take out precipitate of produced polymer which was dried. The results are shown in the following Table 2.

TABLE 2

| | Total pressure, kg./cm.² G | H₂ feed vol. percent | Average partial pressure of H₂, kg./cm.² | Temperature, ° C. | Time, min. | Average rate of polymerization | Polymer | | |
|---|---|---|---|---|---|---|---|---|---|
| | | | | | | | Yield g. | Molecular weight | Density |
| 1 | 47 | 3.8 | 1.66 | 245 | 67 | 24.4 | 27 | 5.4×10⁴ | .960 |
| 2 | 47 | 4.6 | 2.30 | 245 | 100 | 20.2 | 37 | 3.7×10⁴ | .965 |
| 3 | 47 | 0 | 0 | 245 | 50 | 37.2 | 31 | 10.0×10⁴ | .955 |
| 4 | 51 | 1.3 | 0.30 | 255 | 55 | 28.0 | 25.2 | 6.8×10⁴ | .958 |
| 5 | 51 | 3.3 | 1.00 | 255 | 65 | 28.0 | 30.0 | 4.9×10⁴ | .963 |
| 6 | 51 | 0 | 0 | 255 | 57 | 26.5 | 25.2 | 10.6×10⁴ | .954 |

The results shown in Table 2 suggest that if a polymerization reaction temperature is relatively high, the molecular weight of polymer produced is effectively lowered by the introduction of a relatively small amount of hydrogen.

EXAMPLE 4

Preparation of catalyst 130 g. of commercial crystalline alumina trihydrates (Hydrargillite) having average particle size of 70 micron were fed to a reactor of vertical type having 30 mm. diameter and 1 m. length for calcining by dry nitrogen passed through at 400° C. for 2 hours. Gaseous TiCl₄ diluted by nitrogen was passed at 350° C. through the reactor by the same method as in the catalyst manufacturing method of Example 2. Then, nitrogen saturated with carbon tetrachloride (chlorinating agent) at 20° C. was passed through the reactor for 2 hours upwardly from the bottom at 350° C. to prepare catalyst.

Polymerization 1 g. catalyst prepared as mentioned above, 0.2 g. metallic sodium powder, and 400 ml. cyclohexane were fed to a 1 litre autoclave. The autoclave was heated under stirring, and ethylene and hydrogen were introduced thereto while maintaining the temperature at 225° C. and the total pressure at 40 kg./cm.² G.

Upon completion of the reaction, the autoclave was purged of unreacted gases, catalyst was filtered, filtrate was cooled, and precipitate of produced polymer was taken out for drying. The results are shown in the following Table 3.

TABLE 3

| | H₂ feed vol. percent | Time, min. | Average rate of polymerization | Polymer | | |
|---|---|---|---|---|---|---|
| | | | | Yield g. | Density | Molecular weight |
| 1 | 0.8 | 163 | 11.1 | 30.2 | 0.959 | 6.1×10⁴ |
| 2 | 1.5 | 104 | 14.9 | 25.9 | 0.961 | 5.3×10⁴ |
| 3 | 0 | 119 | 15.1 | 29.9 | 0.956 | 8.1×10⁴ |

EXAMPLE 5

Polymerization of ethylene was carried out by the same method as in Example 2, employing the catalyst produced by the method of Example 2 and the same co-catalyst as in Example 2.

As shown in the following Table 4 polymers were found to have different properties one another, dependently of whether or not hydrogen was introduced to the polymerization reaction.

TABLE 4

| | (1) | (2) |
|---|---|---|
| Polymerization conditions: | | |
| Co-catalyst/Catalyst, wt. percent | 0.2 | 0.3 |
| Temperature, ° C | 245 | 220 |
| H₂ feed, vol. percent | 0 | 0.90 |
| Average partial pressure | 0 | 0.40 |
| Properties of Polymer: | | |
| Average molecular weight×10⁴ | 9.6 | 9.7 |
| Melt index | 0.45 | 0.43 |
| Density | 0.953 | 0.957 |
| Tensile strength, kg./cm.² | 245 | 280 |
| Young's modulus, kg./cm.²×10⁻³ | 6.0 | 7.3 |
| Tensile impact strength, kg. cm./cm.² | 240 | 295 |
| Ultimate elongation, percent | 950 | 710 |
| Whiteness, W percent, Hunter's method | 87 | 90 |

It is apparent from Table 4 that the introduction of hydrogen resulted in polymers excellent in mechanical properties and whiteness.

EXAMPLE 6

Polymerization of ethylene was carried out in the same way as in Example 4, employing catalyst prepared by the same method of Example 4 and the same co-catalyst as in Example 4. Table 5 compares two kinds of polymers in regard to the properties which differ dependently of the presence of hydrogen in the polymerization reaction.

TABLE 5

| | (1) | (2) |
|---|---|---|
| Polymerization conditions: | | |
| Co-catalyst/Catalyst, wt. percent | 0.2 | 0.2 |
| Temperature, ° C | 250 | 225 |
| H₂ feed, vol. percent | 0 | 2.5 |
| Partial pressure of H₂ | 0 | 1.4 |
| Properties of polymer: | | |
| Average molecular weight×10⁻⁴ | 5.5 | 5.6 |
| Melt index | 4.8 | 3.9 |
| Density | 0.953 | 0.962 |
| Tensile strength, kg./cm.² | 250 | 280 |
| Young's modulus, kg./cm.²×10⁻³ | 5.4 | 8.5 |
| Tensile impact strength, kg. cm./cm.² | 98 | 125 |
| Ultimate elongation, percent | 390 | 330 |
| Whiteness, W percent, Hunter's method | 87 | 90 |

EXAMPLE 7

Preparation of catalyst 130 g. of commercial crystalline alumina trihydrates (Hydrargillite) having mean particle size of 60 microns were subjected to calcination to form γ-alumina in a vertical type reactor having 30 mm. diameter and 1 m. length. The calcination was carried out by passing dry nitrogen through the reactor for 2 hours at 500° C. The reactor was further passed through, while being maintained at 120° C., by gaseous TiCl₄ and dry nitrogen at a linear velocity of 140 cm./min. upwardly from the bottom for 4 hours. The temperature was raised to 500° C. and at this temperature only dry nitrogen was further admitted to the reactor via the bottom at a linear velocity 70 cm./min.

Polymerization 1 g. of catalyst thus produced, 0.4 g. of sodium hydride and 400 ml. of cyclohexane were put into a 1 litre autoclave, which was then heated under stirring, and ethylene and hydrogen were introduced thereto, while maintaining the temperature at 235° C. and the total pressure at 43 kg./cm.² G., respectively, to carry out polymerization reaction. Upon completion of the reaction, the autoclave was purged of unreacted gases, the catalyst was filtered, the filtrate was cooled, and the precipitated polymer was taken out and dried. The results are shown in the following Table 6.

TABLE 6

| | $H_2$ feed, vol. percent | Average partial pressure of $H_2$, kg./cm.² | Polymer | | |
|---|---|---|---|---|---|
| | | | Time, min. | Yield, g. | Average molecular weight | Density |
| 1 | 10.8 | 3.4 | 180 | 26.8 | $5.6 \times 10^4$ | 0.965 |
| 2 | 13.0 | 4.3 | 180 | 21.0 | $4.7 \times 10^4$ | 0.968 |
| 3 | 0 | 0 | 60 | 30.0 | $25 \times 10^4$ | 0.948 |

EXAMPLE 8

3 g. of catalyst produced by the method of Example 2, an amount of sodium hydride, and 400 ml. of cyclohexane were put into a 1 litre autoclave, which was heated under stirring. Ethylene and hydrogen were introduced to the autoclave at 225° C. under 40 kg./cm.² G of total pressure to carry out polymerization of the reaction.

Upon completion of the reaction, the autoclave was purged of unreacted gases, the catalyst was filtered, the filtrate was cooled, and the precipitated polymer was taken out and dried. The results are shown in Table 7.

TABLE 7

| | NaH, g. | $H_2$ feed, vol. percent | Average partial pressure of $H_2$, kg./cm.² | Time, min. | Average polymerization rate [1] | Polymer | |
|---|---|---|---|---|---|---|---|
| | | | | | | Yield, g. | Average molecular weight |
| 1 | 0.9 | 3.9 | 1.72 | 30 | 23.1 | 34.8 | $8.4 \times 10^4$ |
| 2 | 0.6 | 4.4 | 1.64 | 41 | 15.9 | 32.7 | $8.8 \times 10^4$ |
| 3 | 0.3 | 2.7 | 0.96 | 40 | 14.5 | 39.0 | $9.7 \times 10^4$ |
| 4 | 0.15 | 2.9 | 1.12 | 93 | 6.5 | 30.3 | $8.6 \times 10^4$ |
| 5 | 0.075 | 3.1 | 1.34 | 150 | 2.4 | 18.0 | $9.7 \times 10^4$ |

[1] Produced polymer (g.)/catalyst (g.)×polymerization time in hr.

EXAMPLE 9

400 ml. of cyclohexane and 0.3 g. of sodium hydride were put into a 1 litre autoclave which was heated up to 180° C. under stirring, ethylene was introduced thereto at this temperature, and stirred under 10 kg./cm.² G for 1 hour. The autoclave was then cooled to be purged of the ethylene.

3 g. of catalyst manufactured by the method of Example 2 were added to the autoclave, which was heated under stirring, and a mixture of hydrogen and ethylene which contains 2.8 vol. percent hydrogen was introduced thereto at 225° C. while maintaining the total pressure at 40 kg./cm.² G to carry out polymerization for 43 minutes. Thus, 48.5 g. of polyethylene having $9.8 \times 10^4$ average molecular weight and 0.958 density were obtained.

EXAMPLE 10

1 g. of catalyst manufactured by the method of Example 2, 0.8 g. of lithium hydride dispersed in paraffin wax and 400 ml. of cyclohexane were put into a 1 litre autoclave, which was heated under stirring, and ethylene and hydrogen were introduced thereto while maintaining the temperature at 225° C. and the total pressure at 40 kg./cm.² G to carry out polymerization.

Upon completion of the reaction, the autoclave was purged of the gases, the catalyst was filtered, and the filtrate was cooled to take out the precipitate of polymer which was dried. The results are shown in Table 8.

TABLE 8

| | $H_2$ feed, vol. percent | Average partial pressure of $H_2$, kg./cm.² | Time min. | Polymer | | |
|---|---|---|---|---|---|---|
| | | | | Yield, g. | Average molecular weight | Density |
| 1 | 6.5 | 2.4 | 125 | 22.2 | $8.2 \times 10^4$ | 0.963 |
| 2 | 7.9 | 3.5 | 150 | 27.3 | $7.0 \times 10^4$ | 0.961 |

EXAMPLE 11

200 g. of commercial crystalline alumina trihydrates (Hydrargillite) and 1 litre of water were put into a 2 litre autoclave which was heated at 190° C. for 5 hours. The autoclave was then cooled, and solid materials were filtered, washed by water and dried at 120° C. for 2 hours to obtain crystalline alumina monohydrate (Boehmite) having mean particle size of 60 micron. 100 g. of Boehmite thus obtained were subjected to calcination at 550° C. to form γ-alumina in the same way as in Example 2 which was caused to react with TiCl₄ in the same way as in Example 2 to manufacture catalyst.

1 g. of catalyst thus obtained, 0.4 g. of sodium hydride and 400 ml. of cyclohexane were put into a 1 litre autoclave, which was heated at 225° C. to reach the pressure of 20 kg./cm.² G. Then, hydrogen was introduced to the autoclave, and further, ethylene was introduced thereto to obtain the total pressure of 40 kg./cm.² G. Polymerization reaction was carried out for 240 minutes while introducing ethylene so as to maintain said total pressure.

Upon completion of the reaction, the autoclave was purged of unreacted gases, the catalyst was filtered, and the filtrate was cooled to take out precipitated polymer which was dried. Thus, 20 g. of polyethylene having average molecular weight of $10 \times 10^4$ were obtained.

The polymer which was obtained by the same method as mentioned above excepting the introduction of hydrogen was found to have average molecular weight of $35 \times 10^4$.

EXAMPLE 12

1 g. of catalyst employed in Example 2, 400 ml. of cyclohexane and an amount of co-catalyst indicated in the following Table 9 were put into a 1 litre autoclave and heated under stirring. Ethylene and hydrogen were introduced thereto while maintaining the temperature at 225° C. and the total pressure at 40 kg./cm.$^2$ G to carry out polymerization. Upon completion of the reaction, the autoclave was purged of unreacted gases, the catalyst was filtered, and the filtrate was cooled to take out the precipitate of polymer which was dried. The results are shown in Table 9.

TABLE 9

| | Co-catalyst | | Average partial pressure of H$_2$ kg./cm.$^2$ | Time min. | Polymer | |
|---|---|---|---|---|---|---|
| | Kind | Amount, g. | | | Yield, g. | Average molecular weight |
| 1 | Al powder of 200 mesh | 0.3 | 2 | 240 | 15 | 5.8×10$^4$ |
| 2 | Mg powder of 100 mesh | 0.3 | 2 | 240 | 10 | 5.4×10$^4$ |
| 3 | MgH of 100 mesh | 0.9 | 2 | 60 | 20 | 5.4×10$^4$ |
| 4 | CaH$_2$ of 100 mesh | 0.3 | 2 | 120 | 15 | 5.6×10$^4$ |
| 5 | LiAlH$_4$ of 200 mesh | 0.1 | 2 | 60 | 20 | 5.3×10$^4$ |

What we claim is:

1. A method for production of polyethylene in a polymerization zone which comprises polymerizing ethylene in a hydrocarbon solvent at a temperature up to 350° C. and under a pressure of up to 200 kg./cm.$^2$ G in the presence of a catalyst, a co-catalyst and hydrogen; said catalyst is produced by reacting γ-alumina having a particle size of 10 to 100 microns with gaseous titanium tetrachloride at a temperature of 200 to 700° C., while maintaining the γ-alumina in a fluidized state; the co-catalyst is selected from the class consisting of a metal of Groups I, II and III of the Periodic Table, a hydride and a complex hydride of said metal, the amount of the co-catalyst being 0.01 to 10 parts per 1 part of the catalyst by weight; the said hydrogen being present at a pressure of one hundredth to one-half of the total pressure of ethylene and hydrogen in the polymerization zone.

2. A method as claimed in claim 1, wherein the catalyst is produced by reacting γ-alumina with titanium tetrachloride at a temperature of 300° to 500° C.

3. A method as claimed in claim 1, wherein the co-catalyst is present in an amount of 0.05 to 1.0 part per 1 part of the catalyst by weight.

4. A method as claimed in claim 1, wherein the catalyst is produced by passing gaseous titanium tetrachloride diluted with inert gas through a reactor of vertical type filled with the γ-alumina at a temperature of 300° to 500° C. and a linear velocity of 100 to 700 cm./min.

5. A method for production of polyethylene in a polymerization zone which comprises polymerizing ethylene in a hydrocarbon solvent at a temperature up to 350° C. and under a pressure of up to 200 kg./cm.$^2$ G in the presence of a catalyst, a co-catalyst and hydrogen; said catalyst is produced by reacting γ-alumina having a particle size of 10 to 100 microns with gaseous titanium tetrachloride at a temperature of 200° to 700° C., subsequently contacting the resulting reaction product with a gaseous chlorinating agent at a temperature of 100° to 600° C. until the reaction product has a Cl/Ti ratio of 2.4 to 3.5, while maintaining the particles in a fluidized state; the co-catalyst is selected from the class consisting of a metal of Groups I, II and III of the Periodic Table, a hydride and a complex hydride of said metal, the amount of the co-catalyst being 0.01 to 10 parts per 1 part of the catalyst by weight; the said hydrogen being present at a pressure of one hundredth to one-half of the total pressure of ethylene and hydrogen in the polymerization zone.

6. A method as claimed in claim 5, wherein the co-catalyst is present in an amount of 0.05 to 1.0 part per 1 part of the catalyst by weight.

7. A method as claimed in claim 5, wherein the catalyst is produced by passing gaseous titanium tetrachloride diluted with inert gas through a reactor of vertical type filled with the γ-alumina at a temperature of 300° to 500° C. and a linear velocity of 100 to 700 cm./min., subsequently passing a gas containing a chlorinating agent through the reactor in the same direction as said tetrachloride at a temperature of 200° to 500° C. and a linear velocity of 100 to 700 cm./min.

8. A method for production of polyethylene in a polymerization zone which comprises polymerizing ethylene in a hydrocarbon solvent at a temperature up to 350° C. and under a pressure of up to 200 kg./cm.$^2$ G in the presence of a catalyst, a co-catalyst and hydrogen; said catalyst is produced by contacting γ-alumina having a particle size of 10 to 100 microns with gaseous titanium tetrachloride at a first temperature below 400° C., subsequently contacting the particles with inert gas at a temperature of 300° to 700° C. which is higher than said first temperature, while maintaining the particles in a fluidized state; the co-catalyst is selected from the class consisting of a metal of Groups I, II and III of the Periodic Table, a hydride and a complex hydride of said metal, the amount of the co-catalyst being 0.01 to 10 parts per 1 part of the catalyst by weight; the said hydrogen being present at a pressure of one hundredth to one-half of the total pressure of ethylene and hydrogen in the polymerization zone.

9. A method as claimed in claim 8, wherein the catalyst is produced by contacting γ-alumina with gaseous titanium tetrachloride at a temperature of 50° to 200° C.

10. A method as claimed in claim 8, wherein the co-catalyst is present in an amount of 0.05 to 1.0 part per 1 part of the catalyst by weight.

11. A method as claimed in claim 8, wherein the catalyst is produced by passing gaseous titanium tetrachloride diluted with inert gas through a reactor of vertical type filled with the γ-alumina at a temperature of 50° to 200° C. and a linear velocity of 100 to 700 cm./min., subsequently passing only inert gas through the reactor in the same direction as said tetrachloride at a temperature of 300° to 700° C. and a linear velocity of 100 to 700 cm./min.

References Cited

UNITED STATES PATENTS

| | | | |
|---|---|---|---|
| 3,007,905 | 11/1961 | Bailey | 260—94.9 |
| 3,105,066 | 9/1963 | MacKenzie | 260—94.9 |
| 3,166,542 | 1/1965 | Orzechowski et al. | 260—94.9 |
| 3,255,167 | 6/1966 | Thomas | 260—94.9 |
| 3,324,101 | 6/1967 | Baker et al. | 260—94.9 |
| 3,371,079 | 2/1968 | Peters et al. | 260—94.9 |

JOSEPH L. SCHOFER, Primary Examiner

S. M. LEVIN, Assistant Examiner

U.S. Cl. X.R.

252—441